(12) United States Patent
Reyes et al.

(10) Patent No.: US 9,890,320 B2
(45) Date of Patent: Feb. 13, 2018

(54) METHODS AND SYSTEMS FOR IRON CONTROL USING A PHOSPHINATED CARBOXYLIC ACID POLYMER

(71) Applicant: Halliburton Energy Services, Inc., Houston, TX (US)

(72) Inventors: Enrique Antonio Reyes, Tomball, TX (US); Aaron Michael Beuterbaugh, Spring, TX (US); Alyssa Lynn Smith, Humble, TX (US); Christopher Lynn Smith, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 80 days.

(21) Appl. No.: 14/366,105

(22) PCT Filed: Aug. 20, 2013

(86) PCT No.: PCT/US2013/055728
§ 371 (c)(1),
(2) Date: Jun. 17, 2014

(87) PCT Pub. No.: WO2015/026325
PCT Pub. Date: Feb. 26, 2015

(65) Prior Publication Data
US 2015/0322329 A1    Nov. 12, 2015

(51) Int. Cl.
*C09K 8/52* (2006.01)
*E21B 43/16* (2006.01)
(Continued)

(52) U.S. Cl.
CPC ................ *C09K 8/52* (2013.01); *C09K 8/524* (2013.01); *C09K 8/528* (2013.01); *C09K 8/725* (2013.01);
(Continued)

(58) Field of Classification Search
CPC ....................................................... C09K 8/52
See application file for complete search history.

(56) References Cited

U.S. PATENT DOCUMENTS 3,504,747 A * 4/1970 Fitch ........................ C09K 8/72
166/307
4,096,914 A    6/1978 McLaughlin et al.
(Continued)

FOREIGN PATENT DOCUMENTS

WO    2012/080297 A1    6/2012
WO    2015026325 A1    2/2015

OTHER PUBLICATIONS

Ewing et al, "A Synergistic Chelation System for Acidizing in the Presence of High Iron Concentrations," Society of Petroleum Engineers, SPE 11795, 1983.
(Continued)

*Primary Examiner* — Angela M DiTrani
(74) *Attorney, Agent, or Firm* — McDermott Will & Emery LLP

(57) ABSTRACT

The presence of iron in a subterranean formation, particularly ferric iron, can be problematic during an acidizing operation due to sludge formation that can occur. Methods for treating a subterranean formation in the presence of iron can comprise: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation; and interacting the phosphinated carboxylic acid polymer with ferric iron in the subterranean formation.

16 Claims, 1 Drawing Sheet

(51) Int. Cl.
| | |
|---|---|
| *C09K 8/72* | (2006.01) |
| *E21B 37/06* | (2006.01) |
| *C09K 8/74* | (2006.01) |
| *C09K 8/524* | (2006.01) |
| *C09K 8/528* | (2006.01) |
| *E21B 43/26* | (2006.01) |

(52) U.S. Cl.
CPC .............. *C09K 8/74* (2013.01); *E21B 37/06* (2013.01); *E21B 43/16* (2013.01); *E21B 43/26* (2013.01)

(56) References Cited

U.S. PATENT DOCUMENTS

| | | | | |
|---|---|---|---|---|
| 4,574,050 | A | | 3/1986 | Crowe et al. |
| 4,633,949 | A | * | 1/1987 | Crowe .................. C09K 8/532 166/279 |
| 5,188,179 | A | * | 2/1993 | Gay ........................ C09K 8/54 166/310 |
| 5,622,919 | A | | 4/1997 | Brezinski et al. |
| 5,658,464 | A | * | 8/1997 | Hann ...................... C02F 5/086 210/697 |
| 5,783,524 | A | | 7/1998 | Greindl et al. |
| 5,840,658 | A | * | 11/1998 | Rosario .................... C02F 5/10 504/306 |
| 6,060,435 | A | * | 5/2000 | Beard ...................... C09K 8/78 166/279 |
| 6,192,987 | B1 | | 2/2001 | Funkhouser et al. |
| 6,225,261 | B1 | | 5/2001 | Brezinski et al. |
| 6,436,880 | B1 | | 8/2002 | Frenier |
| 7,219,735 | B2 | * | 5/2007 | Smith ...................... C09K 8/54 166/302 |
| 2003/0064898 | A1 | | 4/2003 | Brezinski |
| 2003/0150613 | A1 | * | 8/2003 | Freiter ..................... C09K 8/74 166/279 |
| 2003/0228985 | A1 | | 12/2003 | Taylor et al. |
| 2006/0065396 | A1 | * | 3/2006 | Dawson ................ C09K 8/508 166/279 |
| 2006/0281636 | A1 | * | 12/2006 | Smith ...................... C09K 8/74 507/277 |
| 2007/0158067 | A1 | * | 7/2007 | Xiao ........................ C09K 8/52 166/279 |
| 2008/0058229 | A1 | * | 3/2008 | Berkland ............... C09K 8/516 507/211 |
| 2010/0311618 | A1 | * | 12/2010 | Rey .......................... C09K 8/68 507/90 |
| 2012/0097392 | A1 | * | 4/2012 | Reyes ....................... C02F 5/12 166/279 |
| 2013/0274155 | A1 | * | 10/2013 | Nasr-El-Din .......... C09K 8/035 507/241 |
| 2014/0202701 | A1 | * | 7/2014 | Patil ........................ C09K 8/74 166/307 |
| 2014/0367101 | A1 | * | 12/2014 | Welton .................. E21B 43/267 166/280.2 |

OTHER PUBLICATIONS

Shu et al., "Impact of Fe (III) on the Performace of VES-Based Acids," Society of Petroleum Engineers, SPE 164149, 2013.
International Search Report and Written Opinion for PCT/US2013/055728 dated May 23, 2014.

* cited by examiner

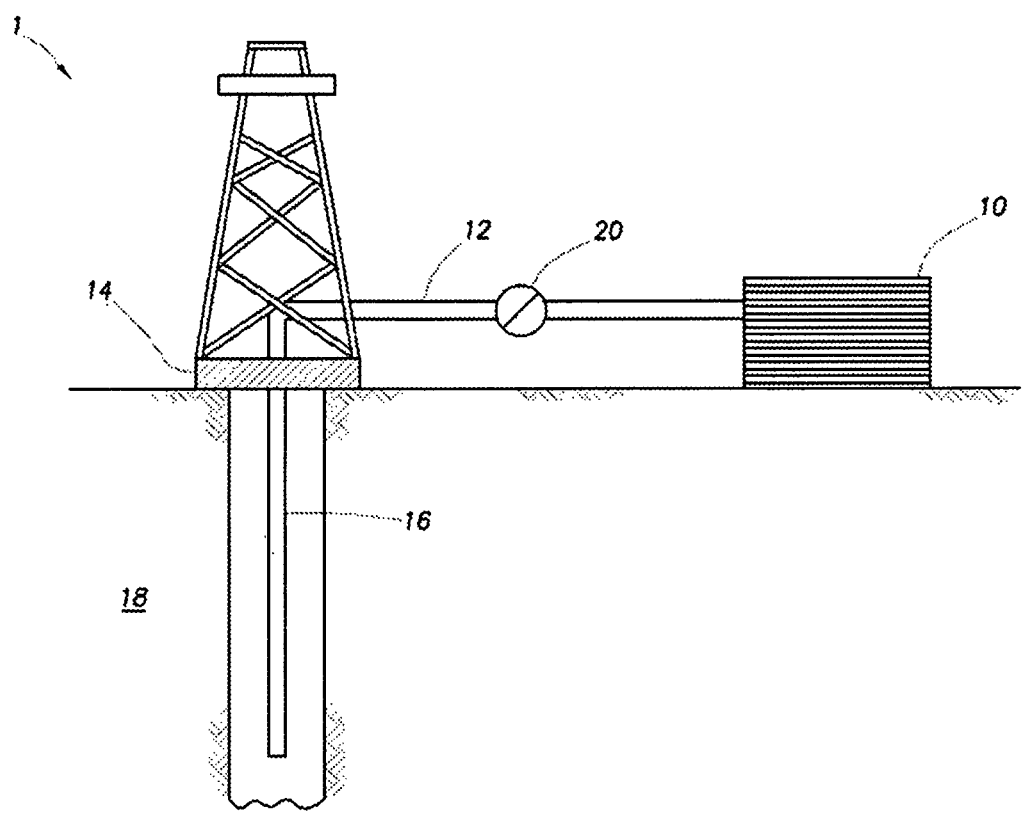

METHODS AND SYSTEMS FOR IRON CONTROL USING A PHOSPHINATED CARBOXYLIC ACID POLYMER

BACKGROUND

The present disclosure generally relates to acidizing a subterranean formation, and, more specifically, to methods for acidizing a subterranean formation in the presence of ferric iron.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. Introduction of an acidizing fluid to the subterranean formation may take place at matrix flow rates without fracturing of the formation matrix, or at higher injection rates and pressures to fracture the formation (i.e., an acid-fracturing operation). During an acidizing operation, an acid-soluble material in the subterranean formation can be dissolved by one or more acids to expand existing flow pathways in the subterranean formation, to create new flow pathways in the subterranean formation, and/or to remove acid-soluble precipitation damage or scale in the subterranean formation. The acid-soluble material being dissolved by the acid(s) can be part of or formed from the native formation matrix or can have been deliberately introduced into the subterranean formation in conjunction with performing a treatment operation (e.g., proppant or gravel particulates). Illustrative substances within the native formation matrix that may be dissolved by an acid include, but are not limited to, carbonates, oxides and aluminosilicates. Other substances can also be dissolved during the course of performing an acidizing operation, and the foregoing substances should not be considered to limit the scope of substances that may undergo dissolution by an acid.

Carbonate formations can contain minerals that comprise a carbonate anion (e.g., calcite (calcium carbonate), dolomite (calcium magnesium carbonate), and siderite (iron carbonate)). When acidizing a carbonate formation, the acidity of the treatment fluid alone can be sufficient to solubilize the carbonate material by decomposing the carbonate anion to carbon dioxide and water, thereby leeching a metal ion into the treatment fluid. Both mineral acids (e.g., hydrochloric acid) and organic acids (e.g., acetic and formic acids) can be used to treat a carbonate formation, often with similar degrees of success. Since it is relatively inexpensive, hydrochloric acid is very commonly used, typically in concentrations up to about 28% by volume.

Siliceous formations can include minerals such as, for example, zeolites, clays, and feldspars. As used herein, the term "siliceous" refers to a substance having the characteristics of silica, including silicates and/or aluminosilicates. Dissolution of siliceous materials during an acidizing operation is thought to be considerably different than acidizing carbonate materials, since the mineral and organic acids that can be effective for acidizing carbonate materials may have little effect on siliceous materials. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during the dissolution of a siliceous material.

When high concentrations of an acid, particularly hydrochloric acid, are present during an acidizing operation, the presence of ferric iron can be an extreme concern for reasons that are discussed hereinbelow. Ferric iron may be derived from a number of sources during an acidizing operation. In some cases, ferric iron can be transported to a subterranean formation via corrosion or descaling of tubulars and storage vessels through which an acid is passing. In some instances, this can be an unfortunate consequence in certain geographic regions where equipment may be poorly maintained or improperly used. In other cases, ferric iron may be solubilized in a subterranean formation through dissolution of an iron-containing mineral therein (e.g., iron carbonate, goethite, magnetite, hematite, and the like). Due to its ready oxidation, any initially produced ferrous iron is usually oxidized to produce ferric iron.

The presence of ferric iron during an acidizing operation can be problematic for a number of reasons. Foremost, as the acid becomes spent during dissolution of the matrix and the pH of the treatment fluid rises, gelatinous ferric hydroxide, can precipitate from the initially solubilized ferric ions. Such precipitation can begin to occur at a pH of about 2 and be essentially complete at just above a pH of about 3. In addition, ferric iron can readily form insoluble materials with sludge-forming components such as, for example, asphaltenes, maltenes, and porphyrins or related macrocyclic compounds, any of which may constitute a component of many crude oils. Sludging can also be exacerbated by the acidic nature of the treatment fluid. Hydrochloric acid, especially at concentrations of about 15% by volume or above, can particularly promote sludge formation in the presence of a sludge-forming component. Sludges, including ferric hydroxide, and other insoluble materials formed from ferric iron can be exceedingly detrimental for production of a hydrocarbon resource, since the very acidizing operation that was meant to increase the permeability of a subterranean formation may instead detrimentally decrease it.

A number of approaches have been developed for addressing the presence of ferric iron in a subterranean formation. Ferrous hydroxide is much more soluble than is ferric hydroxide, the former remaining soluble up to a pH of about 7. Therefore, reducing agents and/or antioxidants have been employed to reduce ferric iron to the ferrous state and/or maintain it there. Ascorbic acid, erythorbic acid, and related reducing agents have often been used in this regard. Another strategy that has been used for iron control involves the sequestration of ferric iron with a chelating agent. Still another strategy involves interacting the ferric iron with a hydroxycarboxylic acid to suppress its precipitation. However, all of these approaches may have difficulties. Chelating agents and other additives may be expensive and not readily soluble in the highly acidic fluids that are often used to carry out an acidizing operation. Solubility may be particularly compromised at hydrochloric acid concentrations of about 15% by volume or above. In addition, chelating agents sometimes may not be effective for forming a metal complex at low pH values, and/or they may not effectively form a metal complex at higher temperatures. Similarly, it can be difficult to maintain the highly oxidizable ferrous ions in a reduced state. Moreover, some of the reducing agents that can effectively maintain iron ions in their reduced state can have detrimental impacts on a subterranean formation.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location.

DETAILED DESCRIPTION

The present disclosure generally relates to acidizing a subterranean formation, and, more specifically, to methods for acidizing a subterranean formation in the presence of ferric iron.

One or more illustrative embodiments incorporating the disclosure herein are presented below. Not all features of an actual implementation are described or shown in this application for the sake of clarity. It is to be understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for one having ordinary skill in the art and the benefit of this disclosure.

As discussed above, current approaches for addressing the presence of ferric iron during an acidizing operation can have disadvantages. Many of the agents that are currently used for controlling ferric iron can have limited solubility in extremely acidic fluids, such as acidizing fluids comprising about 15% or above hydrochloric acid by volume. Moreover, current approaches for controlling ferric iron can considerably add to the cost and complexity of performing an acidizing operation.

The present inventors discovered that certain agents that inhibit the formation of scale in a subterranean formation surprisingly address the presence of ferric iron by decreasing or preventing the precipitation of ferric hydroxide or other iron-derived sludges formed in the presence of various sludge-forming components (e.g., asphaltenes, maltenes, porphyrins or related macrocyclic compounds, and the like). In particular, the present inventors surprisingly discovered that phosphinated carboxylic acid polymers, agents can limit the formation of iron-based sludges under conditions where such sludges typically form. Phospinated carboxylic acid polymers can present a number of advantages in this regard, as discussed hereinafter.

One of the chief advantages of phosphinated carboxylic acid polymers is that they can be freely soluble in extremely acidic fluids, including 28% hydrochloric acid. This feature allows such polymers to be directly included in acidizing fluids for the purpose of addressing the presence of ferric iron. Moreover, the good solubility of such polymers can allow for more highly acidic fluids to be used during an acidizing operation than would otherwise be possible with less acid-soluble iron control agents, thereby allowing more vigorous acidizing to take place. The ability to include an iron control agent directly in a highly acidic fluid can be especially advantageous in light of the fact that sludging can often increase at higher acid concentrations.

Iron control using a phosphinated carboxylic acid polymer may take place at very low polymer concentrations, typically below about 5.5% by weight of a treatment fluid. Thus, affecting iron control by using a phosphinated carboxylic acid polymer does not significantly add to the cost of performing an acidizing operation. Since the phosphinated carboxylic acid polymer may be effective for addressing the presence of ferric iron even at very low concentrations, it is believed that the polymer does not function by iron chelation, although the embodiments described herein are not to be mechanistically limited in this regard. Chelating agents, in contrast, are believed to be most effective when they are present in a stoichiometric amount relative to a metal ion being complexed therewith. That is, chelating agents are often more effectively used at higher concentrations. Without being bound by any theory or mechanism, it is believed that phosphinated carboxylic acid polymers may suppress the formation of iron-derived sludge through inhibiting crystal growth, similar to the manner in which these polymers function in inhibiting the formation of scale.

It is also believed that the use of phosphinated carboxylic acid polymers for iron control does not block their scale control functionality. Hence, phosphinated carboxylic acid polymers may advantageously act in a dual fashion during an acidizing operation by both controlling iron and inhibiting scale formation.

In addition, phosphinated carboxylic acid polymers may be used together with chelating agents for purposes of addressing the presence of ferric iron, without either agent appreciably impacting the function of the other. Accordingly, by using a chelating agent in combination with a phosphinated carboxylic acid polymer, the presence of ferric iron may be addressed by two apparently different mechanistic routes. Moreover, the chelating agent can also sequester other problematic metal ions in the subterranean formation, in addition to other advantages that are discussed hereinafter.

Although conventional chelating agents such as ethylenediaminetetraacetic acid may be used as the chelating agent, certain biodegradable chelating agents may be more advantageously used, particularly aminopolycarboxylic acid chelating agents. Not only do biodegradable chelating agents help maintain environmental favorability, but a number of biodegradable chelating agents are highly soluble in extremely acidic fluids, such as 28% hydrochloric acid. Many other types of chelating agents, in contrast, often display limited solubilities at low pH values, particularly at pH values below about 2 where their carboxylic acid groups can be substantially protonated. Although the chelating agent may initially be inactive for complexing a metal ion due to the low pH of the acidizing fluid, as the acidizing fluid interacts with the matrix and becomes spent, the chelating agent may again become active for complexation of ferric iron and other metal ions. In addition, as described in commonly owned U.S. patent application Ser. No.13/925,888, filed on Jun. 25, 2013, published as US 2014-0374107A1, and incorporated herein by reference in its entirety, aminopolycarboxylic acid chelating agents may provide beneficial effects, such as controlling the acidizing rate, even when present outside their normal operative pH range. In addition to complexing ferric iron or other metal ions, chelating agents may also help promote dissolution of calcium carbonate or another metal carbonate material in a ligand-assisted fashion within a subterranean formation. Thus, the chelating agent may also function in a dual capacity, if present. Further disclosure regarding chelating agents, particularly biodegradable chelating agents, follows hereinbelow.

In some embodiments, the treatment fluids and methods described herein can be used in matrix acidizing operations. That is, in some embodiments, the treatment fluids described herein can be introduced to a subterranean formation below a fracture gradient pressure of the subterranean formation. In such embodiments, interacting the treatment fluid with the formation matrix may result in a desirable creation of wormholes therein. In other embodiments, the treatment fluids described herein can be introduced to a subterranean formation at or above a fracture gradient pressure of the subterranean formation, such that one or more fractures are created or enhanced in the subterranean formation. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

As used herein, the term "phosphinated" refers to a compound characterized by the formula $R_1$—O—P($=$O)$R_2R_3$, where $R_1$, $R_2$ and $R_3$ comprise alkyl or aryl groups that can be the same or different.

As used herein, the term "ferric iron" refers to any iron compound that contains an iron ion in the +3 state.

As used herein, the term "polymer" refers to both homopolymers containing one type of monomer unit and copolymers containing more than one type of monomer unit.

As used herein, the term "sludge" refers to an insoluble compound derived from ferric iron.

In some embodiments, methods described herein can comprise: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation; and interacting the phosphinated carboxylic acid polymer with ferric iron in the subterranean formation.

In some embodiments, interacting the phosphinated carboxylic acid polymer with the ferric iron can comprise decreasing an incidence of iron-containing sludge within the subterranean formation. The iron-containing sludge can comprise a precipitate of ferric hydroxide, a substance formed from the interaction of ferric iron with a sludge-forming component, or any combination thereof. Illustrative sludge-forming components can include, for example, asphaltenes, maltenes, porphyrins or related macrocyclic compounds, or any combination thereof. These sludge-forming components may be present in the subterranean formation. Although it is not believed that the structure of the sludge formed by interacting asphaltenes with ferric ions is known with any degree of certainty, the formation of such sludge is well known and can be problematic, as described in U.S. Pat. No. 4,096,914, which is incorporated herein by reference in its entirety.

The phosphinated carboxylic acid polymer used in the embodiments described herein may be a homopolymer or a copolymer. In some embodiments, the phosphinated carboxylic acid polymer may be sulfonated or hydroxylated, which can improve its solubility in the treatment fluid. In some embodiments, the phosphinated carboxylic acid polymer may comprise a phosphinated acrylic acid polymer. An illustrative phosphinated carboxylic acid polymer that may be used in the embodiments described herein is which is available from Halliburton Energy Services, Inc. of Houston, Tex.

Generally, the amount of the phosphinated carboxylic acid polymer in the treatment fluid should be sufficient to decrease or eliminate the formation of an iron-containing sludge in the subterranean formation. In some embodiments, the concentration of the phosphinated carboxylic acid polymer in the treatment fluid can range between about 0.1% to about 10% of the treatment fluid by weight. In other embodiments, the phosphinated carboxylic acid polymer can range between about 0.1% to about 5.5% of the treatment fluid by weight, or between about 1% and about 5% of the treatment fluid by weight.

In various embodiments, the treatment fluids described herein can comprise an aqueous carrier fluid as their continuous phase. Suitable aqueous carrier fluids may include, for example, fresh water, acidified water, salt water, seawater, produced water, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for usation in the embodiments described herein.

In various embodiments, the treatment fluids described herein can comprise an acid and have a pH of less than about 3. In some embodiments, the acid can comprise a mineral acid. Suitable mineral acids can include, for example, hydrochloric acid, hydrobromic acid, and the like. In some embodiments, hydrofluoric acid can be used as an alternative, particularly when treating a siliceous formation also containing a carbonate material. In other embodiments, the acid can comprise an organic acid. Suitable organic acids can include, for example, formic acid, acetic acid, methanesulfonic acid, and the like. Any combination of mineral acids and organic acids may also be used. In some embodiments, acid-generating compounds may be used in a like manner. Examples of suitable acid-generating compounds that may be used in some embodiments described herein include, for example, esters, aliphatic polyesters, orthoesters, poly(orthoesters), poly(lactides), poly(glycolides), poly(c-caprolactones), poly(hydroxybutyrates), anhydrides, poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

In more particular embodiments, the treatment fluid may contain hydrochloric acid. In various embodiments, the treatment fluid may contain about 1% to about 30% hydrochloric acid by volume, or about 10% to about 30% hydrochloric acid by volume, or about 15% to about 30% hydrochloric acid by volume, or about 20% to about 30% hydrochloric acid by volume, or about 25% to about 30% hydrochloric acid by volume. In still more particular embodiments, the treatment fluids may contain about 15% to about 28% hydrochloric acid by volume. In some embodiments, the treatment fluids may contain about 28% hydrochloric acid by volume.

In various embodiments, the phosphinated carboxylic acid polymer may also inhibit the formation of a scale in the subterranean formation. Specifically, in some embodiments, methods described herein may further comprise inhibiting the formation of a scale in the subterranean formation with the phosphinated carboxylic acid polymer, where the scale comprises a divalent metal ion scale. Divalent metal ion scales can include, for example, calcium carbonate scale, barium sulfate scale, strontium sulfate scale, calcium sulfate scale, iron sulfide scale, and any combination thereof. The phosphinated carboxylic acid polymer may inhibit scale formation at the same time it is interacting with the ferric iron, or it may inhibit scale formation after its interaction with the ferric iron is complete.

In various embodiments, the subterranean formation into which the treatment fluid is introduced may contain a carbonate material. Illustrative carbonate materials can include, for example, calcium carbonate, magnesium carbonate, calcium magnesium carbonate, or any combination thereof. In some embodiments, the methods described herein may further comprise reacting a carbonate material in the subterranean formation with a component of the treatment fluid. For example, in some embodiments, the methods may comprise reacting the treatment fluid with the carbonate material such that wormholes are formed therein. In some embodiments, reacting the carbonate material with a component of the treatment fluid can comprise reacting the acid with the carbonate material to at least partially dissolve the carbonate material.

Although the methods described herein can be effective for acidizing a carbonate formation, it is to be recognized that iron control can also be desirable in other types of subterranean formations. For example, in some embodiments, the methods described herein may be implemented in a sandstone or like siliceous subterranean formation in order to address the presence of ferric iron therein. In such embodiments, the treatment fluids may also affect the dissolution of a carbonate material that may be present in a siliceous formation.

In some embodiments, methods described herein can comprise: providing treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation containing a carbonate material; reacting the carbonate material in the subterranean formation with a component of the treatment fluid; and interacting the phosphinated carboxylic acid polymer with ferric iron in the subterranean formation, so as to decrease an incidence of iron-containing sludge within the subterranean formation.

In some embodiments, the treatment fluids may further comprise a chelating agent. In such embodiments, the chelating agent may also react with a carbonate material to affect its dissolution. Without being bound by any theory or mechanism, it is believed that the interaction of a chelating agent with a carbonate material can affect its dissolution through formation of a ligand complex with a metal comprising the carbonate material. Metals from a carbonate material that may be complexed include, for example, calcium and magnesium. In such embodiments, the carbonate material can be dissolved by both the acid and the chelating agent in the treatment fluid. In some embodiments, the acid and the chelating agent may act to dissolve the carbonate material at the same time, and in other embodiments, the acid and the chelating agent may act to dissolve the carbonate material separately. For example, in some embodiments, the pH of the treatment fluid may initially be so low that the chelating agent is substantially protonated and unable to supply the required electron density to form a ligand complex with a metal. However, as described in U.S. patent application Ser.No.13/925,888, published as US 2014-0374107A1, incorporated by reference above, a chelating agent may still exert beneficial effects during an acidizing operation even when the chelating agent is fully protonated and not actively complexing a metal ion. Once the acid in the treatment fluid becomes at least partially spent and the pH of the treatment fluid rises, the chelating agent may become active for metal ion complexation to occur.

In various embodiments, the methods described herein may further comprise complexing a metal ion in the subterranean formation with the chelating agent, once the pH of the treatment fluid rises and the chelating agent again becomes active for metal ion complexation to occur. The metal ion being complexed by the chelating agent may comprise ferric iron, a metal ion comprising the carbonate material, or any combination thereof. The metal ion may be complexed with the chelating agent through a direct reaction of the chelating agent with a surface in the subterranean formation (i.e., a carbonate material surface), or the metal ion may be complexed by the chelating agent after the metal ion has undergone an initial dissolution by the acid. In some embodiments, methods described herein may further comprise reacting the chelating agent with the ferric iron, a carbonate material, or any combination thereof.

A number of aminopolycarboxylic acid chelating agents may be suitable for use as the chelating agent in the treatment fluids and methods described herein. Many of these aminopolycarboxylic acid chelating agents may be biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acids may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1, 2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1, 2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N'''-disuccinic acid, triethylenetetramine-N,N''''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof.

Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5.

In some embodiments, as an alternative to aminopolycarboxylic acid chelating agents, traditional chelating agents such as, for example, nitrilotriacetic acid (NTA), N-(2-hydroxyethyl)ethylenediaminetriacetic acid (HEDTA), hydroxyethyliminodiacetic acid (HEIDA), diphenylaminesulfonic acid (DPAS), ethylenediaminedi(o-hydroxyphenylacetic) acid (EDDHA), any salt thereof, any derivative thereof, or the like may be included in the treatment fluids described herein. However, as described above, these chelating agents may be less soluble in extremely acidic fluids and more difficult to use in some cases.

In some or other alternative embodiments, suitable chelating agents can include hydroxamates, as described in commonly owned U.S. patent application Ser. No.13/663,825, filed on Oct. 30, 2012, patented as U.S. Pat. No. 8,887,805, and incorporated herein by reference in its entirety. In some or other alternative embodiments, suitable chelating agents can include pyridinecarboxylic acids, as described in commonly owned U.S. patent application Ser. No. 13/837,090, filed on Apr. 3, 2013, patented as U.S. Pat. No. 9,334,716, and incorporated herein by reference in its entirety.

In some embodiments, the chelating agent may comprise the neutral form of the chelating agent. In other embodiments, the chelating agent may comprise a salt form of the chelating agent, including an alkali metal salt form of the chelating agent. Other salt forms of the chelating agent may also be used, including, for example, an ammonium salt form or a quaternary ammonium salt form.

In various embodiments, the concentration of the chelating agent in the treatment fluid may range between about 0.1% to about 40% of the treatment fluid by weight. In some embodiments, the concentration of the chelating agent in the treatment fluid may range between about 0.1% to about 5% of the treatment fluid by weight, or between about 1% to about 10% of the treatment fluid by weight, or between about 5% to about 15% of the treatment fluid by weight, or between about 0.5% to about 5% of the treatment fluid by weight, or between about 10% to about 25% of the treatment fluid by weight, or between about 10% to about 40% of the treatment fluid by weight, or between about 30% to about 40% of the treatment fluid by weight.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In various embodiments, systems configured for delivering the treatment fluids described herein to a downhole location are described. In various embodiments, the systems can comprise a pump fluidly coupled to a tubular, the tubular containing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon beirig ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In some embodiments, the present disclosure provides methods comprising: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation; and interacting the phosphinated carboxylic acid polymer with ferric iron in the subterranean formation.

In some embodiments, the present disclosure provides methods comprising: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation containing a carbonate material; reacting the carbonate material in the subterranean formation with a component of the treatment fluid; and interacting the phosphinated carboxylic acid polymer with ferric iron in the subterranean formation, so as to decrease an incidence of iron-containing sludge within the subterranean formation.

In some embodiments, the present disclosure provides systems comprising: a pump fluidly coupled to a tubular, the tubular containing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid.

Embodiments disclosed herein include:

A. Methods of treating a subterranean formation. The methods comprise: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation; and interacting the phosphinated carboxylic acid polymer with ferric iron in the subterranean formation.

B. Methods of treating a subterranean formation. The methods comprise: providing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid; introducing the treatment fluid into a subterranean formation containing a carbonate material; reacting the carbonate material in the subterranean formation with a component of the treatment fluid; and interacting the phosphinated carboxylic acid polymer with ferric iron in the subterranean formation, so as to decrease an incidence of iron-containing sludge within the subterranean formation.

C. Systems for treating a subterranean formation. The systems comprise: a pump fluidly coupled to a tubular, the tubular containing a treatment fluid comprising an acid and an iron stabilization agent comprising a phosphinated carboxylic acid polymer, the treatment fluid having a pH of about 3 or below and the phosphinated carboxylic acid polymer being soluble in the treatment fluid.

Each of embodiments A, B, and C may have one or more of the following additional elements in any combination:

Element 1: wherein the acid comprises a mineral acid.

Element 2: wherein the treatment fluid contains about 15% to about 28% hydrochloric acid by volume.

Element 3: wherein the phosphinated carboxylic acid polymer is sulfonated.

Element 4: wherein the method further comprises reacting a carbonate material in the subterranean formation with a component of the treatment fluid.

Element 5: wherein the treatment fluid further comprises a chelating agent.

Element 6: wherein the chelating agent comprises a compound selected from the group consisting of methylglycine diacetic acid, glutamic acid diacetic acid, β-alanine diacetic acid, ethylenediaminedisuccinic acid, any salt thereof, and any combination thereof.

Element 7: wherein the method further comprises reacting the chelating agent with the ferric iron, a carbonate material, or any combination thereof.

Element 8: wherein a concentration of the phosphinated carboxylic acid polymer in the treatment fluid ranges between about 0.1% to about 5.5% of the treatment fluid by weight.

Element 9: wherein interacting the phosphinated carboxylic acid polymer with the ferric iron comprises decreasing an incidence of iron-containing sludge within the subterranean formation.

Element 10: wherein the subterranean formation also contains a sludge-forming component that forms a sludge in the presence of ferric iron, the sludge-forming component comprising a substance selected from the group consisting of an asphaltene, a maltene, a porphyrin or related macrocyclic compound, and any combination thereof.

Element 11: wherein the method further comprises inhibiting the formation of a scale in the subterranean formation with the phosphinated carboxylic acid polymer, the scale comprising a divalent metal ion scale.

By way of non-limiting example, exemplary combinations applicable to A, B, C include:

The method of A or B in combination with elements 2 and 3.

The method of A or B in combination with elements 2, 3 and 5.

The method of A or B in combination with elements 2, 8 and 10.

The method of A or B in combination with elements 1 and 10.

The method of A or B in combination with elements 1, 8 and 10.

The method of A or B in combination with elements 1, 8 and 11.

To facilitate a better understanding of the present disclosure, the following examples of preferred or representative embodiments are given. In no way should the following examples be read to limit, or to define, the scope of the disclosure.

EXAMPLES

Example 1

Three commercial stabilizing or scale inhibiting substances that were miscible with 28% hydrochloric acid were selected for this test. The first substance selected was a sulfonated, phosphinated carboxylic acid polymer that is available from Halliburton Energy Services (Inhibitor 1). The second substance selected was a sulfonated copolymer of maleic anhydride that is available from Kemira (Inhibitor 2). The third substance selected was an alkylsulfonic acid that is available from BASF (Inhibitor 3). For purposes of controlling ferric iron precipitation in a spent acidizing fluid, each putative iron control agent was initially dissolved at 5 volume % loading or less at a pH of <0, and the pH was subsequently raised to simulate spending of the acid. The initial $Fe^{3+}$ concentration in each test was 1000 ppm. After mixing all components together, the solutions were allowed to stand for >12 hours before the pH was adjusted. After pH adjustment with NaOH or KOH solution (3 M), the solutions were again allowed to stand for >12 hours before being visually observed for precipitation and color changes. Testing results are summarized in Table 1.

TABLE 1

| Inhibitor | Conc. (Vol. %) | Final pH | Observations |
| --- | --- | --- | --- |
| 1 | 2 | 1 | Fail: Precipitation at pH = 0-0.5 |
| 1 | 3 | 3 | Pass: All components soluble |
| 1 | 4 | 3 | Pass: All components soluble |
| 1 | 5 | 3 | Pass: All components soluble |
| 2 | 3 | 1 | Fail: Precipitation at pH = 0-0.5 |
| 3 | 10 | 1 | Fail: Precipitation at pH = 0-0.5 |

Testing results were evaluated by visually assessing the qualitative degree of precipitation after a stabilization period.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of, construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. When "comprising" is used in a claim, it is open-ended. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   providing a treatment fluid comprising an acid and an iron stabilization agent comprising a sulfonated phosphinated carboxylic acid polymer, the treatment fluid having a pH of about 3 or below and the sulfonated phosphinated carboxylic acid polymer being soluble in the treatment fluid, wherein the sulfonated phosphinated carboxylic acid polymer is a phosphino copolymer of acrylic acid and sulfonic acid;
   introducing the treatment fluid into a subterranean formation; and
   interacting the sulfonated phosphinated carboxylic acid polymer with dissolved ferric iron in the subterranean formation without forming a ferric iron precipitate,
   wherein a concentration of the sulfonated phosphinated carboxylic acid polymer in the treatment fluid ranges between 3% to 5% of the treatment fluid by weight.

2. The method of claim 1, wherein the acid comprises a mineral acid.

3. The method of claim 2, wherein the treatment fluid contains about 15% to about 28% hydrochloric acid by volume.

4. The method of claim 1, further comprising:
reacting a carbonate material in the subterranean formation with a component of the treatment fluid.

5. The method of claim 1, wherein the treatment fluid further comprises a chelating agent selected from the group consisting of methylglycine diacetic acid, glutamic acid diacetic acid, β-alanine diacetic acid, ethylenediaminedisuccinic acid, any salt thereof, and any combination thereof.

6. The method of claim 5, further comprising:
reacting the chelating agent with the dissolved ferric iron, a carbonate material, or any combination thereof.

7. The method of claim 1, wherein interacting the sulfonated phosphinated carboxylic acid polymer with the dissolved ferric iron comprises decreasing an incidence of iron-containing sludge within the subterranean formation.

8. The method of claim 7, wherein the subterranean formation also contains a sludge-forming component that forms a sludge in the presence of dissolved ferric iron, the sludge-forming component comprising a substance selected from the group consisting of an asphaltene, a maltene, a porphyrin, and any combination thereof.

9. The method of claim 7, further comprising:
inhibiting the formation of a scale in the subterranean formation with the sulfonated phosphinated carboxylic acid polymer, the scale comprising a divalent metal ion scale.

10. A method comprising:
providing a treatment fluid comprising an acid and an iron stabilization agent comprising a sulfonated phosphinated carboxylic acid polymer, the treatment fluid having a pH of about 3 or below and the sulfonated phosphinated carboxylic acid polymer being soluble in the treatment fluid, wherein the sulfonated phosphinated carboxylic acid polymer is a phosphino copolymer of acrylic acid and sulfonic acid;
introducing the treatment fluid into a subterranean formation containing a carbonate material;
reacting the carbonate material in the subterranean formation with a component of the treatment fluid; and
interacting the sulfonated phosphinated carboxylic acid polymer with dissolved ferric iron in the subterranean formation, so as to decrease an incidence of iron-containing sludge within the subterranean formation;
wherein the sulfonated phosphinated carboxylic acid polymer interacts with the dissolved ferric iron without forming a ferric iron precipitate, and
wherein a concentration of the sulfonated phosphinated carboxylic acid polymer in the treatment fluid ranges between 3% to 5% of the treatment fluid by weight.

11. The method of claim 10, wherein the acid comprises a mineral acid.

12. The method of claim 11, wherein the treatment fluid contains about 15% to about 28% hydrochloric acid by volume.

13. The method of claim 10, wherein the subterranean formation also contains a sludge-forming component that forms a sludge in the presence of dissolved ferric iron, the sludge-forming component comprising a substance selected from the group consisting of an asphaltene, a maltene, a porphyrin, and any combination thereof.

14. The method of claim 10, wherein the treatment fluid further comprises a chelating agent selected from the group consisting of methylglycine diacetic acid, glutamic acid diacetic acid, β-alanine diacetic acid, ethylenediaminedisuccinic acid, any salt thereof, and any combination thereof.

15. The method of claim 14, further comprising:
reacting the chelating agent with the dissolved ferric iron, the carbonate material, or any combination thereof.

16. The method of claim 10, further comprising:
inhibiting the formation of a scale in the subterranean formation with the sulfonated phosphinated carboxylic acid polymer, the scale comprising a divalent metal ion scale.

* * * * *